US012368013B2

(12) United States Patent
Zhao et al.

(10) Patent No.: US 12,368,013 B2
(45) Date of Patent: Jul. 22, 2025

(54) THERMAL CUT-OFF DEVICE FOR HIGH POWER APPLICATIONS

(71) Applicant: Therm-O-Disc, Incorporated, Mansfield, OH (US)

(72) Inventors: Changcai Zhao, Zhuhai (CN); Lijuan Huang, Fujian (CN); Wei Shi, Zhuhai (CN); Kangsheng Lin, Zhuhai (CN); Guojun Xiao, Zhuhai (CN); Rong Guan, Zhuhai (CN); Xiang Gong, Zhuhai (CN); Qiang Zhao, Zhuhai (CN)

(73) Assignee: Therm-O-Disc, Incorporated, Westerville, OH (US)

( * ) Notice: Subject to any disclaimer, the term of this patent is extended or adjusted under 35 U.S.C. 154(b) by 52 days.

(21) Appl. No.: 18/368,688

(22) Filed: Sep. 15, 2023

(65) Prior Publication Data

US 2024/0096577 A1 Mar. 21, 2024

(30) Foreign Application Priority Data

Sep. 16, 2022 (CN) ......................... 202211128068.9

(51) Int. Cl.
*H01H 37/76* (2006.01)

(52) U.S. Cl.
CPC ........ *H01H 37/761* (2013.01); *H01H 37/765* (2013.01); *H01H 2037/762* (2013.01)

(58) Field of Classification Search
CPC .................................... H01H 37/76–2037/769
See application file for complete search history.

(56) References Cited

U.S. PATENT DOCUMENTS 4,246,561 A 1/1981 McVey
4,380,001 A * 4/1983 Kasamatsu ........ H01H 85/0241 337/5

(Continued)

FOREIGN PATENT DOCUMENTS

CN 112967914 A 6/2021
EP 0315565 A2 5/1989

(Continued)

OTHER PUBLICATIONS

Extended European Search Report for EP231965096, conducted Jan. 19, 2024.

*Primary Examiner* — Jacob R Crum
(74) *Attorney, Agent, or Firm* — Harness, Dickey & Pierce, P.L.C.

(57) ABSTRACT

A temperature fuse assembly for a high-power DC circuit is provided. The temperature fuse assembly includes a case extending from a first case end to a second case end and an isolated lead projecting from the second case end. A bushing electrically isolates the isolated lead from the case. A high-gauge wire is electrically connected to the case at a first wire end and electrically connected to the isolated lead at a second wire end. A portion of the high-gauge wire is helically wound about an exterior of the bushing. When a temperature of the temperature fuse assembly exceeds a threshold temperature, the temperature fuse assembly is configured to conduct a DC current of the high-power DC circuit through the high-gauge wire. The high-gauge wire is configured to melt under a load of the DC current and interrupt the high-power DC circuit.

10 Claims, 2 Drawing Sheets

(56) References Cited

U.S. PATENT DOCUMENTS

Figure 1:
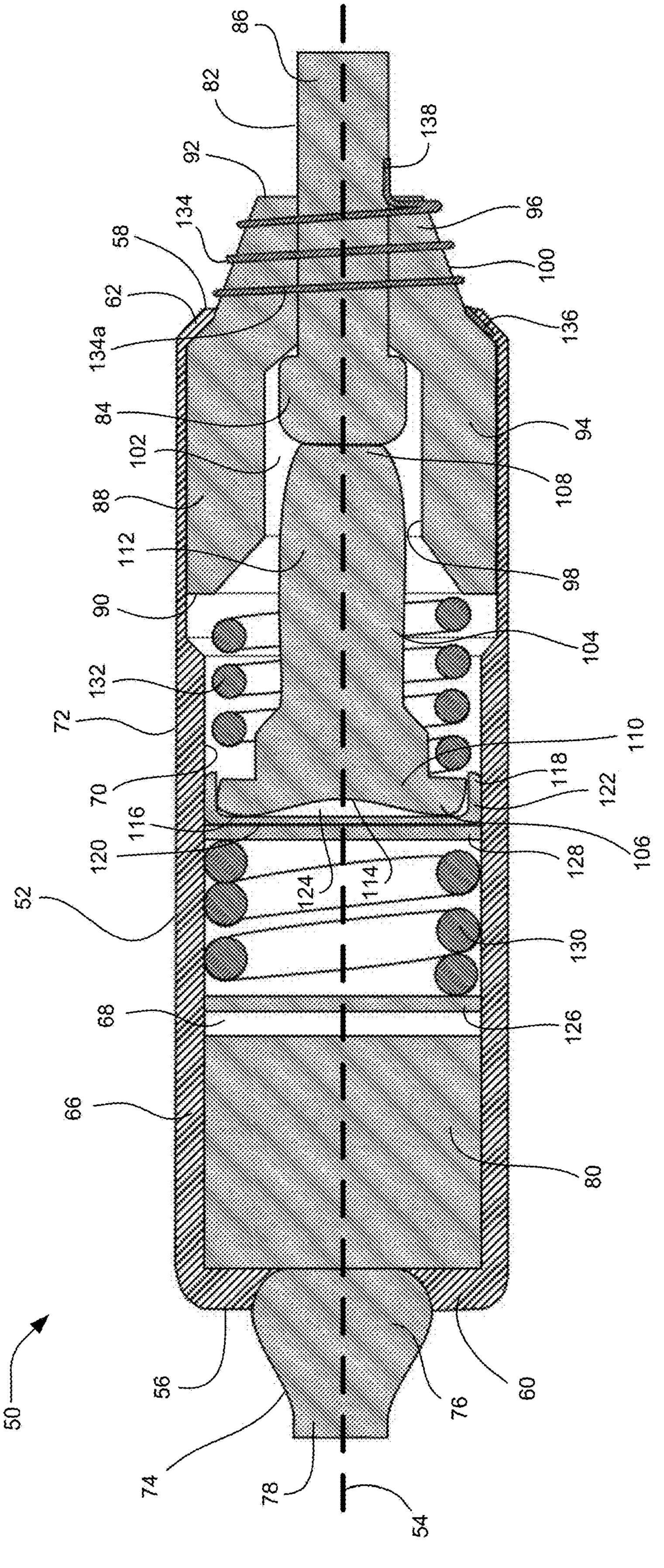

| | | | | |
|---|---|---|---|---|
| 4,411,061 | A | 10/1983 | Clapper et al. | |
| 5,530,417 | A | 6/1996 | Hohider | |
| 2005/0179516 | A1* | 8/2005 | Yoshikawa | H01H 37/765 337/401 |
| 2010/0219929 | A1* | 9/2010 | Lee | H01H 37/765 337/182 |
| 2015/0054613 | A1* | 2/2015 | Sakaguchi | C22C 5/08 337/111 |

FOREIGN PATENT DOCUMENTS

| | | | |
|---|---|---|---|
| EP | 0315565 | A3 | 3/1990 |
| EP | 2660828 | A1 | 11/2013 |
| WO | 8303706 | A1 | 10/1983 |
| WO | 2015/169223 | A1 | 11/2015 |

* cited by examiner

THERMAL CUT-OFF DEVICE FOR HIGH POWER APPLICATIONS

FIELD

The present disclosure relates to a thermal cut-off device for high power applications and, particularly high power DC applications.

BACKGROUND

This section provides background information related to the present disclosure which is not necessarily prior art.

Operating temperatures for electrical devices, including appliances, electronics, motors and the like typically have an optimum or preferred range. At temperatures above the optimum or preferred range, damage can occur to the device or its components, or safely operating the device becomes a concern. Various devices are capable of protecting against over-temperature conditions by interrupting the electrical current in the device.

One device particularly suitable for over-temperature protection and current interruption is known as a thermal cut-off (TCO) device. A TCO device is typically installed in an electrical application between the current source and electrical components, such that the TCO device is capable of interrupting the circuit continuity in or to a device in the event of an undesirable over-temperature condition. Accordingly, TCO devices are often designed to shut off the flow of electric current to the application in an irreversible manner.

However, current TCO devices are limited in their interrupt capability to only low power applications. For example, current TCO devices may only interrupt 16 VDC/50A, 24 VDC/5A and 380 VDC/1A. There is still a need to expand the interrupt capability of TCO devices to high power applications such as electric vehicles (EVs) and household appliances.

SUMMARY

This section provides a general summary of the disclosure, and is not a comprehensive disclosure of its full scope or all of its features.

The present disclosure provides a temperature fuse assembly for a high-power DC circuit. The temperature fuse assembly includes a case, an isolated lead, a bushing, and a high-gauge wire. The case extends from a first case end to a second case end. The isolated lead projects from the second case end. The bushing electrically isolates the isolated lead from the case and the bushing projects from the second case end. The high-gauge wire is electrically connected to the case at a first wire end and electrically connected to the isolated lead at a second wire end. A portion of the high-gauge wire is helically wound about an exterior of the bushing. When a temperature of the temperature fuse assembly exceeds a threshold temperature, the temperature fuse assembly is configured to conduct a DC current of the high-power DC circuit through the high-gauge wire. The high-gauge wire is configured to melt under a load of the DC current and interrupt the high-power DC circuit.

In some configurations of the temperature fuse assembly of the above paragraph, a fixed lead is electrically connected to the case and projects from the first case end.

In some configurations of the temperature fuse assembly of either of the above paragraphs, a movable contact member is disposed in the case and positioned between the fixed lead and the isolated lead.

In some configurations of the temperature fuse assembly of any of the above paragraphs, a thermal pellet is disposed in the case and positioned between the fixed lead and the movable contact member. The thermal pellet is composed of a non-electrically conductive material that transitions from a solid physical state to a non-solid physical state at or above the threshold temperature.

In some configurations of the temperature fuse assembly of any of the above paragraphs, a first electrical circuit is established from the fixed lead to the case, from the case to the movable contact member, and from the movable contact member to the isolated lead. A second electrical circuit is established from the fixed lead to the case, from the case to the high-gauge wire, and from the high-gauge wire to the isolated lead. The second electrical circuit is electrically parallel to the first electrical circuit and the second electrical circuit has a higher resistance than the first electrical circuit.

In some configurations of the temperature fuse assembly of any of the above paragraphs, when a temperature of the thermal pellet exceeds the threshold temperature, the movable contact member is electrically disconnected from the isolated lead and the DC current flows through the second electrical circuit.

In some configurations of the temperature fuse assembly of any of the above paragraphs, when a temperature of the thermal pellet is below the threshold temperature, the movable contact member is electrically connected to both the fixed lead and the isolated lead and the DC current flows through the first electrical circuit.

In some configurations of the temperature fuse assembly of any of the above paragraphs, the portion of the high-gauge wire abuts the exterior of the bushing.

In some configurations of the temperature fuse assembly of any of the above paragraphs, the portion of the high-gauge wire is helically wound around the bushing in a clockwise or counter-clockwise direction.

In some configurations of the temperature fuse assembly of any of the above paragraphs, a sealing compound is disposed over the high-gauge wire such that the high-gauge wire is embedded in the sealing compound.

The present disclosure provides a thermal cut-off device for interrupting an operating current in a high-power DC circuit. The thermal cut-off device includes a case, a first fixed electrically conductive member, a second fixed electrically conductive member, a bushing, a third movable electrically conductive member, and a high-gauge wire. The case extends from a first case end to a second case end. The first fixed electrically conductive member is electrically connected to the case and disposed at the first case end. The second fixed electrically conductive member is disposed at the second case end. The bushing is positioned radially between the second fixed electrically conductive member and the case. The bushing electrically isolates the second fixed electrically conductive member from the case. The third movable electrically conductive member is electrically connected to the case and disposed axially between the first fixed electrically conductive member and the second fixed electrically conductive member. The high-gauge wire comprises a first wire end electrically connected to the case and a second wire end electrically connected to the second fixed electrically conductive member. A portion of the high-gauge wire between the first wire end and the second wire end is helically wound around the bushing. When a temperature of the thermal cut-off device is above a threshold temperature, the third movable electrically conductive member is electrically disconnected from the second fixed electrically conductive member and the operating current is shunt to the high-gauge wire.

In some configurations of the thermal cut-off device of the above paragraph, the portion of the high-gauge wire abuts the bushing.

In some configurations of the thermal cut-off device of either of the above paragraphs, the portion of the high-gauge wire is helically wound around the bushing in a clockwise or counter-clockwise direction.

In some configurations of the thermal cut-off device of any the above paragraphs, the portion of the high-gauge wire is helically wound around the bushing N times and N is an integer.

In some configurations of the thermal cut-off device of any the above paragraphs, N is greater than one and N is less than ten.

In some configurations of the thermal cut-off device of any the above paragraphs, the first wire end and the second wire end are positioned adjacent to the bushing.

In some configurations of the thermal cut-off device of any the above paragraphs, the first wire end is positioned adjacent to the second case end.

In some configurations of the thermal cut-off device of any the above paragraphs, the bushing extends from a first bushing end to a second bushing end, the first bushing end is disposed inside the case and the second bushing end is disposed outside the case.

In some configurations of the thermal cut-off device of any the above paragraphs, the second wire end is positioned adjacent to the second bushing end.

The present disclosure provides a thermal cut-off device for interrupting an operating current in a high-power DC circuit. The thermal cut-off device includes a case, a first fixed electrically conductive member, a thermally responsive member, a second fixed electrically conductive member, a bushing, a third movable electrically conductive member, a first biasing member, a second biasing member, and a high-gauge wire. The case extends along a longitudinal axis from a first case end to a second case end. The first fixed electrically conductive member is electrically connected to the case and disposed at the first case end. The first fixed electrically conductive member extends from the case in a direction along the longitudinal axis. The thermally responsive member is disposed in the case near the first case end and comprises a non-electrically conductive material that transitions from a solid physical state to a non-solid physical state at or above a threshold temperature. The second fixed electrically conductive member is disposed at the second case end and extends from the case in a direction along the longitudinal axis. The bushing is disposed radially between the second fixed electrically conductive member and the case and comprises an electrically insulating material. The bushing electrically isolates the second fixed electrically conductive member from the case. The third movable electrically conductive member is disposed axially between the thermally responsive member and the second fixed electrically conductive member. The first biasing member is disposed axially between the thermally responsive member and the third movable electrically conductive member. The first biasing member biases the third movable electrically conductive member in a first direction along the longitudinal axis toward the second fixed electrically conductive member with a first biasing force. The second biasing member is disposed axially between the third movable electrically conductive member and the second case end. The second biasing member engages the third movable electrically conductive member and biases the third movable electrically conductive member in a second direction along the longitudinal axis away from the second fixed electrically conductive member with a second biasing force. The second biasing force is less than or equal to the first biasing force. The high-gauge wire comprises a first wire end electrically connected to the case and a second wire end electrically connected to the second fixed electrically conductive member. A portion of the high-gauge wire between the first wire end and the second wire end is helically wound around the bushing. When the thermally responsive member is below the threshold temperature, the third movable electrically conductive member is electrically connected to both the first fixed electrically conductive member and the second fixed electrically conductive member and the operating current flows through the first fixed electrically conductive member, the third movable electrically conductive member and the second fixed electrically conductive member. When the thermally responsive member is above the threshold temperature, the third movable electrically conductive member is electrically disconnected from the second fixed electrically conductive member and the operating current is shunt to the high-gauge wire. The high-gauge wire is configured to melt under a load comprising the operating current.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
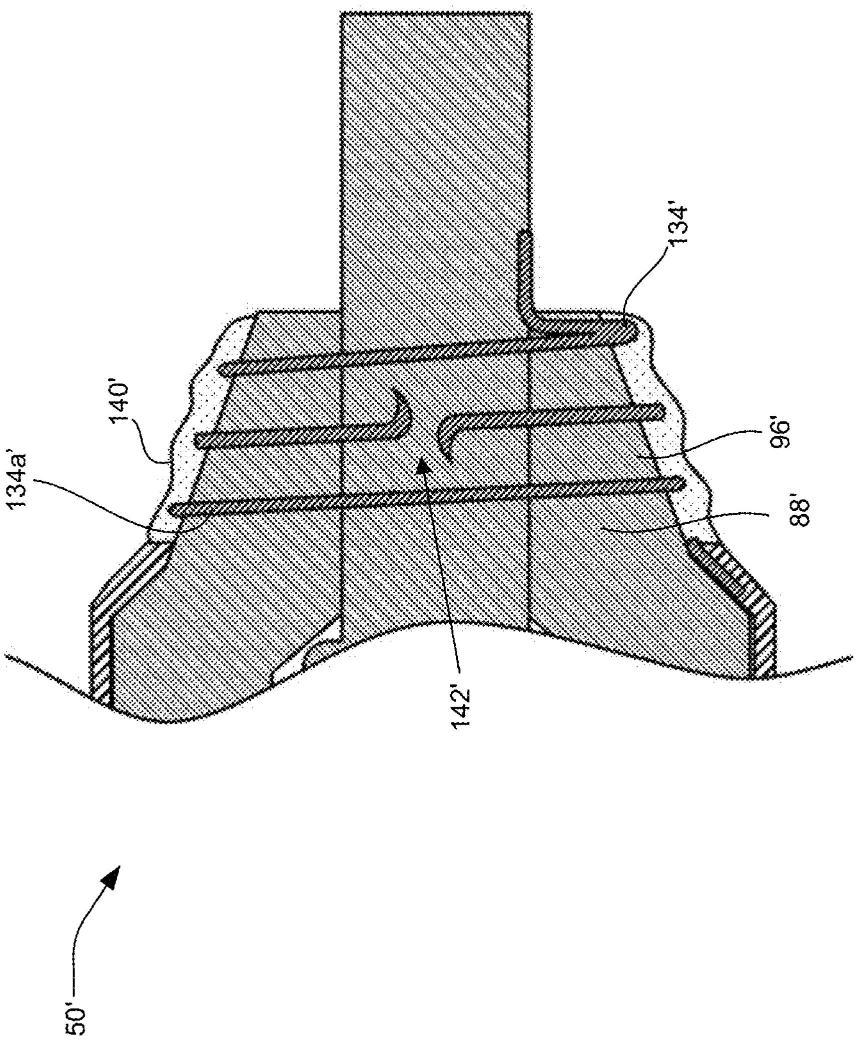

FIG. 1 is a front cross-sectional view of a thermal cut-off device according to the principles of the present disclosure; and FIG. 2 is a partial front cross-sectional view of another thermal cut-off device according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a thermal cut-off device 50 (i.e., temperature fuse assembly) that is capable of interrupting a DC circuit is provided. More specifically, the thermal cut-off device 50 is capable of interrupting a high power DC circuit, as used in electric vehicles (EVs) and household appliances. For example, the high power DC circuit may include 155 VDC/17A and 400 VDC/30A.

The thermal cut-off device 50 of the present disclosure improves the operating capabilities and provides other advantages over known thermal cutoff devices, such as the thermal cut-off devices described in U.S. Pat. No. 5,530,417 and in U.S. Pat. No. 9,378,910, each of which is incorporated in its entirety herein by reference. For example, the thermal cut-off device 50 of the present disclosure demonstrates faster interrupt speeds, increased reliability and durability and is more resilient to external forces and better protected from damage.

The thermal cut-off device 50 includes a case 52 extending along a longitudinal axis 54 between a first case end 56 and a second case end 58 opposite to the first case end 56. A first wall 60 is disposed at the first case end 56 and a second wall 62 having a case opening is disposed at the second case end 58. A sidewall 66 extends between the first and second walls 60, 62. The first wall 60, the second wall 62 and the sidewall 66 cooperate to define a case cavity 68 within the case 52. The case 52 has an inner case surface 70 and an outer case surface 72 opposite to the inner case surface 70.

A first fixed electrically conductive member 74 (i.e., a first lead) is electrically connected to the case 52 and disposed at the first case end 56. The first lead 74 includes a first lead head 76 that is positioned within the first wall 60 of the case 52 and a first lead body 78 that extends away from the first lead head 76 in a direction along the longitudinal axis 54. In other words, the first lead 74 is partially positioned within the first wall 60 of the case 52 and projects from the first case end 56.

A thermally responsive member 80 (i.e., a thermal pellet) is disposed within the case cavity 68 and positioned adjacent to the first wall 60 of the case 52. The thermal pellet 80 is comprised of a non-electrically conductive material that transitions from a solid physical state to a non-solid physical state at or above a threshold temperature. Material compositions for the thermal pellet 80 possessing properties suitable for use in the thermal cut-off device of the present disclosure are well-known in the art.

A second fixed electrically conductive member 82 (i.e., a second lead, isolated lead) is disposed at the second case end 58. The second lead 82 includes a second lead head 84 that is received within the case cavity 68 via the case opening and a second lead body 86 that extends away from the second lead head 84 in a direction along the longitudinal axis 54. In other words, the second lead 82 is partially positioned within the case 52 and projects from the second case end 58. Accordingly, the first and second leads 74, 82 are disposed at opposite ends of the case 52 and extend in opposite directions.

A bushing 88 is disposed at the second case end 58 and is composed of an electrically insulating material. For example, the electrically insulating material may include ceramic. The bushing 88 extends between a first bushing end 90 and a second bushing end 92 opposite of the first bushing end 90. The first bushing end 90 is positioned within the case cavity 68 and the second bushing end 92 is positioned outside the case 52. The bushing 88 extends through the second case end 58 and encloses the case opening. Accordingly, a first portion 94 of the bushing 88 is positioned inside the case 52 and a second portion 96 of the bushing 88 is positioned outside the case 52. The first portion 94 of the bushing 88 abuts the inner case surface 70. Additionally, the bushing 88 includes an inner bushing surface 98 and an outer bushing surface 100 (i.e., exterior of the bushing). The inner bushing surface 98 defines a bushing opening 102 that extends between the first bushing end 90 and the second bushing end 92. The bushing opening 102 is aligned with the longitudinal axis 54. The second lead 82 is received in the bushing opening 102 via the second bushing end 92. The second lead head 84 and a portion of the second lead body 86 is positioned within the bushing opening 102. More specifically, the portion of the second lead body 86 abuts the inner bushing surface 98 and thereby, encloses the bushing opening 102 at the second bushing end 92. Accordingly, the bushing 88 is positioned to electrically isolate the second lead 82 from the case 52.

A third movable electrically conductive member 104 (i.e., a movable contact member, a floating contact member) is disposed within the case 52 and positioned between the thermal pellet 80 and the second lead 82. The movable contact member 104 extends between a first member end 106 and a second member end 108. The first member end 106 is positioned within the case cavity 68 and the second member end 108 is positioned within the bushing opening 102. More specifically, the second member end 108 is received in the second bushing end 92 of the bushing 88 and is operable to be in movable and electrical contact with the second lead head 84.

The movable contact member 104 includes a head 110 and an elongated shank 112. The head 110 is disposed at the first member end 106 and the elongated shank 112 extends from the head 110 to the second member end 108. In one example, the head 110 has a nominal diameter ranging from about 2.30 millimeters to about 3.30 millimeters, and a preferred diameter of between 2.90 millimeters and 2.70 millimeters. The elongated shank 112 has a nominal diameter ranging from about 1.25 millimeters to about 1.75 millimeters, and a preferred diameter of 1.52 millimeters. The elongated shank 112 curves radially inward such that a diameter at the second member end is about 1.00 millimeters. However, the head 110 and elongated shank 112 of the movable contact member 104 may be sized to any suitable diameter.

The head 110 of the movable contact member 104 may have any of a variety of shapes, such as hemi-spherical, conical, concave or convex, for example. Optionally, a conical depression 114 may be formed in the head 110 at the first member end 106 of the movable contact member 104. The conical depression 114 extends towards the second member end 108 along the longitudinal axis 54. Accordingly, the head 110 of the movable contact member 104 may have a head contact surface 116 formed at the first member end 106. In the illustrated example, the head contact surface 116 is formed in an annular or ring-shape about the conical depression 114. However, the head contact surface 116 may be formed in any other suitable shape. The movable contact member 104 has a depression depth measured from the head contact surface 116 to an apex of the conical depression 114, along the longitudinal axis 54. In one example, the depression depth ranges from about 0.05 millimeters to about 0.25 millimeters, including a preferred depth of 0.15 millimeters.

A sliding contact 118 may be disposed within the case cavity 68. The sliding contact 118 can include a body 120 having a peripheral or circumferential lip or edge that can engage the inner case surface 70 of the case 52. In one configuration, a plurality of fingers 122 extend from the body 120 and are circumferentially-spaced around the body 120. The body 120 and plurality of fingers 122 cooperate to define a recess 124. The head 110 of the movable contact member 104 is received within the recess 124 of the sliding contact 118 and is positioned in electrical contact with the body 120 of the sliding contact 118. Additionally, the plurality of fingers 122 are in sliding engagement with the inner case surface 70 of the case 52 to provide electrical contact therebetween. Therefore, the sliding contact 118 is in electrical contact with the case 52 and the movable contact member 104.

A first disc 126 and a second disc 128 may be disposed within the case cavity 68 and abut the inner case surface 70. The first and second disc 126, 128 are spaced apart along the longitudinal axis 54. More specifically, the first disc 126 is positioned adjacent to the thermal pellet 80 and the second disc 128 is positioned adjacent to the sliding contact 118. The first and second disc 126, 128 are configured to be slidable along the longitudinal axis 54 within the case cavity 68.

A first biasing member 130 (i.e., a first spring) is disposed between the first and second discs 126, 128. A second biasing member 132 (i.e., a second spring) is disposed between the sliding contact 118 and the first bushing end 90. The second spring 132 extends helically around the movable contact member 104. Each of the first and second springs 130, 132 may be a straight trip spring, as illustrated, or alternatively, a tapered spring. The first spring 130 is configured to bias the sliding contact 118 and the movable contact member 104 in a first direction along the longitudinal axis 54 and toward second case end 58 with a first biasing force. The second spring 132 is configured to bias the sliding contact 118 and the movable contact member 104 in a second direction along the longitudinal axis 54 and toward the first case end 56 with a second biasing force. The second biasing force is less than or equal to the first biasing force.

The thermal cut-off device 50 includes a high-gauge (i.e., small diameter) wire 134 having a relatively high resistance. The high-gauge wire 134 can be made from Ag, Au, AgCu alloy, AgSn alloy, AgZn or AgCuNi alloy. The high-gauge wire 134 can have a wire gauge generally ranging from about 24 ga. to about 50 ga., and, more specifically, between 32 ga. and 44 ga. The high-gauge wire can have a nominal electrical resistance of 100 ohm/1000 ft to 1200 ohm/1000 ft, more specifically, 350 ohm/1000 ft to 700 ohm/1000 ft. Of course, depending upon the operating conditions and/or application in which the thermal cut-off device 50 is used, a preferred gauge and resistance of the high-gauge wire 134 may be different. The high-gauge wire 134 extends between a first wire end 136 and a second wire end 138 opposite of the first wire end 136. A wire length is measured from the first wire end 136 to the second wire end 138. In one example, the wire length ranges from about 5 millimeters to about 30 millimeters. More preferably, the wire length is about 10 millimeters to about 20 millimeters. The first wire end 136 is electrically connected to the case 52. More specifically, the first wire end 136 is electrically connected to the second wall 62 of the case 52 and positioned adjacent to the bushing 88. The second wire end 138 is electrically connected to the second lead 82. More specifically, the second wire end 138 is electrically connected to the second lead body 86 and positioned adjacent to the second bushing end 92.

At least a portion of the high-gauge wire 134 between the first wire end 136 and the second wire end 138 may abut the outer bushing surface 100 at the second portion 96 of the bushing 88. A portion of high-gauge wire 134 may be disposed on or around the bushing 88. In other words, a portion of the high-gauge wire 134 may take the form, e.g., of a wire winding **134*a* that is wound, wrapped, circumferentially disposed, or otherwise positioned about the bushing 88 and/or the outer bushing surface 100. The wire winding 134*a* may encircle the bushing 88 N times, wherein N is an integer between 1 and 10. For example, the wire winding 134*a* may be wound around the bushing 88 at least once. In another example, the wire winding 134*a* may be wound around the bushing less than ten times. In the illustrated example, the wire winding 134*a* encircles the bushing 88** three times.

The wire winding 134*a* may take the form of a cylindrical coil or a helical coil; it may be symmetrical, asymmetrical, uniform or non-uniform, and/or have a constant pitch or a variable pitch. The wire winding 134*a* may be wound in a clockwise or counter-clockwise direction. In another example, the wire winding 134*a* may be disposed annularly about the outer bushing surface 100 in a serpentine pattern that may extend back and forth from the second case end 58 to the second bushing end 92, or any partial distance in between. Alternatively, the portion of the wire winding 134*a* may be formed in any other suitable pattern on or about the outer bushing surface 100.

Advantageously, the positioning of the high-gauge wire 134 against the case 52, the outer bushing surface 100, and the second lead 82 provides support and/or protection for the high-gauge wire 134, thereby increasing the reliability and durability of the thermal cut-off device 50. Accordingly, the high-gauge wire is more resilient to external forces and is better protected from damage. The high-gauge wire 134 can also increase the interrupt speed.

With reference to FIG. 2, another thermal cut-off device 50' is provided. The thermal cut-off device 50' is the same as the thermal cut-off device 50, except that the thermal cut-off device 50' includes a dielectric and, optionally, thermally insulating sealing compound 140'. The sealing compound 140' may be disposed over a high-gauge wire 134', and more specifically, a wire winding 134*a'*. Additionally, the sealing compound 140' may be disposed over the second portion 96' of the bushing 88'. In this configuration, the high-gauge wire 134' may also be embedded in the sealing compound 140'. The sealing compound 140' can be operable to further protect the high-gauge wire 134' from damage and act as an electrical and thermal insulator.

The operation of the thermal cut-off devices 50, 50' will now be described. Because the operation of the thermal cut-off device 50 and the thermal cut-off device 50' is the same, only reference numbers for thermal cut-off device 50 will be used to describe the operation. Returning to FIG. 1, the thermal cut-off device 50 provides protection against overheating by interrupting the DC circuit between the first lead 74 and the second lead 82 when the thermal cut-off device 50 experiences a temperature that meets or exceeds a threshold cut-off temperature, such as a predetermined operating temperature. When the temperature of thermal cut-off device 50 meets or exceeds the threshold cut-off temperature, the electric current is interrupted and the breaks the continuity of the electric circuit in which the thermal cut-off device 50 is disposed. The threshold cut-off temperature for the thermal cut-off device 50 can be based on the physical properties of the thermal pellet 80.

FIG. 1 shows the thermal cut-off device 50 in a normal operating state (e.g., under normal operating conditions, including temperature) where a main or first electric circuit is closed between the first lead 74 and the second lead 82. Under normal operating conditions, when the thermal pellet 80 is below the threshold temperature, the movable contact member 104 is electrically connected to both the first lead 74 and the second lead 82. More specifically, the thermal pellet 80 is in a solid physical state and the second biasing force of the second spring 132 is less than the first biasing force of the first spring 130. Accordingly, a net force acts against the sliding contact 118 to urge the sliding contact 118 into electrical contact with the first member end 106 of the movable contact member 104. In this manner, the first electric circuit is established and an operating current flows from the first lead 74 to the first wall 60 of the case 52, from the first wall 60 of the case 52 to the sidewall 66 of the case 52, from the sidewall 66 of the case 52 to the sliding contact 118, from the sliding contact 118 to the movable contact member 104, and from the movable contact member 104 to the second lead 82. The first electric circuit has a low resistance to promote efficient operation of the thermal cut-off device and reduce any current-induced ($I^2R$) heating.

The high-gauge wire 134 also provides electrical continuity in the thermal cut-off device 50. More specifically, a second electric circuit is established from the first lead 74 to the first wall 60 of the case 52, to the sidewall 66 of the case 52, to the second wall 62 of the case 52, to the high-gauge wire 134 via the first wire end 136, through the high-gauge wire 134 to the second wire end 138 and finally to the second lead 82. The second electric circuit is electrically parallel to the first electric circuit. The second electric circuit has a high resistance because of the high-gauge wire 134. The operating current, which seeks the path of least resistance, flows through the first electrical circuit under normal operating conditions.

During operation, if the temperature of the thermal cut-off device 50 and the thermal pellet 80 rises to meet or exceed the threshold cut-off temperature, the continuity of the first electrical circuit through the thermal cut-off device 50 is broken. More specifically, the thermal pellet 80 transforms to a non-solid physical state and no longer occupies volume in the case cavity 68. Accordingly, the first spring 130 no longer biases the sliding contact 118 into engagement with the movable contact member 104 with enough force to overcome the bias of the second spring 132. Consequently, the bias of the second spring 132 forces the movable contact member 104 out of electrical contact with the second lead 82.

In conventional thermal cut-off devices, at the separation of the movable contact member 104 from the second lead 82 (i.e., when the movable contact member 104 disengages from the second lead 82), especially in high power applications, the operating current may attempt to continue to flow and/or arc between the movable contact member 104 to the second lead 82. When the operating current attempts to flow and/or arc between the movable contact 104 and the second lead 82, the movable contact 104 and the second lead 82 may fuse (i.e., weld) together. Accordingly, the movable contact 104 is not able to disengage from the second lead 82 to create a break in the first electrical circuit. This may cause damage to the device in which the thermal cut-off device is installed. However, in the thermal cut-off device 50 of the present disclosure, the second electric circuit acts as a shunt and provides the operating current with an alternative electrical path. More particularly, as the first electric circuit is broken, the path of least resistance for the operating current is to flow through the second electric circuit.

The high-gauge wire 134 having a high resistance is configured to quickly melt under a load comprising the operating current. The temperature of the high-gauge wire 134 rises sharply due to $I^2R$ heating as the operating current flows through the high-gauge wire 134. Subsequently, the high-gauge wire 134 quickly reaches its fusing temperature and melts to interrupt the second electric circuit, and increasing the interrupt speed if the device. More specifically, a break (see 142' in FIG. 2) in the high-gauge wire 134 is created in a location where the high-gauge wire 134 begins to melt, thereby interrupting the flow of current through the thermal cut-off device 50. Because the operating current travels to the high-gauge wire 134 for at least a duration of time (i.e., duration of shunt) before the break in the high-gauge wire 134 is created, the risk of arcing between the movable contact member 104 and the second lead 82 is significantly reduced or eliminated. In the illustrated example, the duration of time ranges from about 50 milliseconds to 60 seconds, and preferrably 200 milliseconds to 30 seconds. However, the duration of time varies depending on a number of factors including the material of the high-gauge wire 134, the gauge of high-gauge wire 134, the length of the high-gauge wire 134, the resistance of the high-gauge wire 134, the current load flowing through the high-gauge wire 134, and the voltage load flowing through the high-gauge wire 134. Accordingly, the duration of time may be modified to any suitable time.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A temperature fuse assembly for a high-power DC circuit comprising:

a case extending from a first case end to a second case end;

an isolated lead projecting from the second case end;

a bushing electrically isolating the isolated lead from the case, the bushing projecting from the second case end; and a high-gauge wire electrically connected to the case at a first wire end and electrically connected to the isolated lead at a second wire end, wherein a portion of the high-gauge wire is wound about an exterior of the bushing, wherein, when a temperature of the temperature fuse assembly exceeds a threshold temperature, the temperature fuse assembly is configured to conduct a DC current of the high-power DC circuit through the high-gauge wire, and wherein the high-gauge wire is configured to melt under a load of the DC current and interrupt the high-power DC circuit.

2. The temperature fuse assembly of claim 1, further comprising a fixed lead electrically connected to the case and projecting from the first case end.

3. The temperature fuse assembly of claim 2, further comprising a movable contact member disposed in the case and positioned between the fixed lead and the isolated lead.

4. The temperature fuse assembly of claim 3, further comprising a thermal pellet disposed in the case and positioned between the fixed lead and the movable contact member, wherein the thermal pellet is composed of a non-electrically conductive material that transitions from a solid physical state to a non-solid physical state at or above the threshold temperature.

5. The temperature fuse assembly of claim 4, wherein:

a first electrical circuit is established from the fixed lead to the case, from the case to the movable contact member, and from the movable contact member to the isolated lead, a second electrical circuit is established from the fixed lead to the case, from the case to the high-gauge wire, and from the high-gauge wire to the isolated lead, the second electrical circuit is electrically parallel to the first electrical circuit, and the second electrical circuit has a higher resistance than the first electrical circuit.

6. The temperature fuse assembly of claim 5, wherein when a temperature of the thermal pellet exceeds the threshold temperature, the movable contact member is electrically disconnected from the isolated lead and the DC current flows through the second electrical circuit.

7. The temperature fuse assembly of claim 5, wherein when a temperature of the thermal pellet is below the threshold temperature, the movable contact member is electrically connected to both the fixed lead and the isolated lead and the DC current flows through the first electrical circuit.

8. The temperature fuse assembly of claim 1, wherein the portion of the high-gauge wire abuts the exterior of the bushing.

9. The temperature fuse assembly of claim 1, wherein the portion of the high-gauge wire is helically wound around the bushing in a clockwise or counter-clockwise direction.

10. The temperature fuse assembly of claim 1, further comprising a sealing compound disposed over the high-gauge wire such that the high-gauge wire is embedded in the sealing compound.

* * * * *